UNITED STATES PATENT OFFICE.

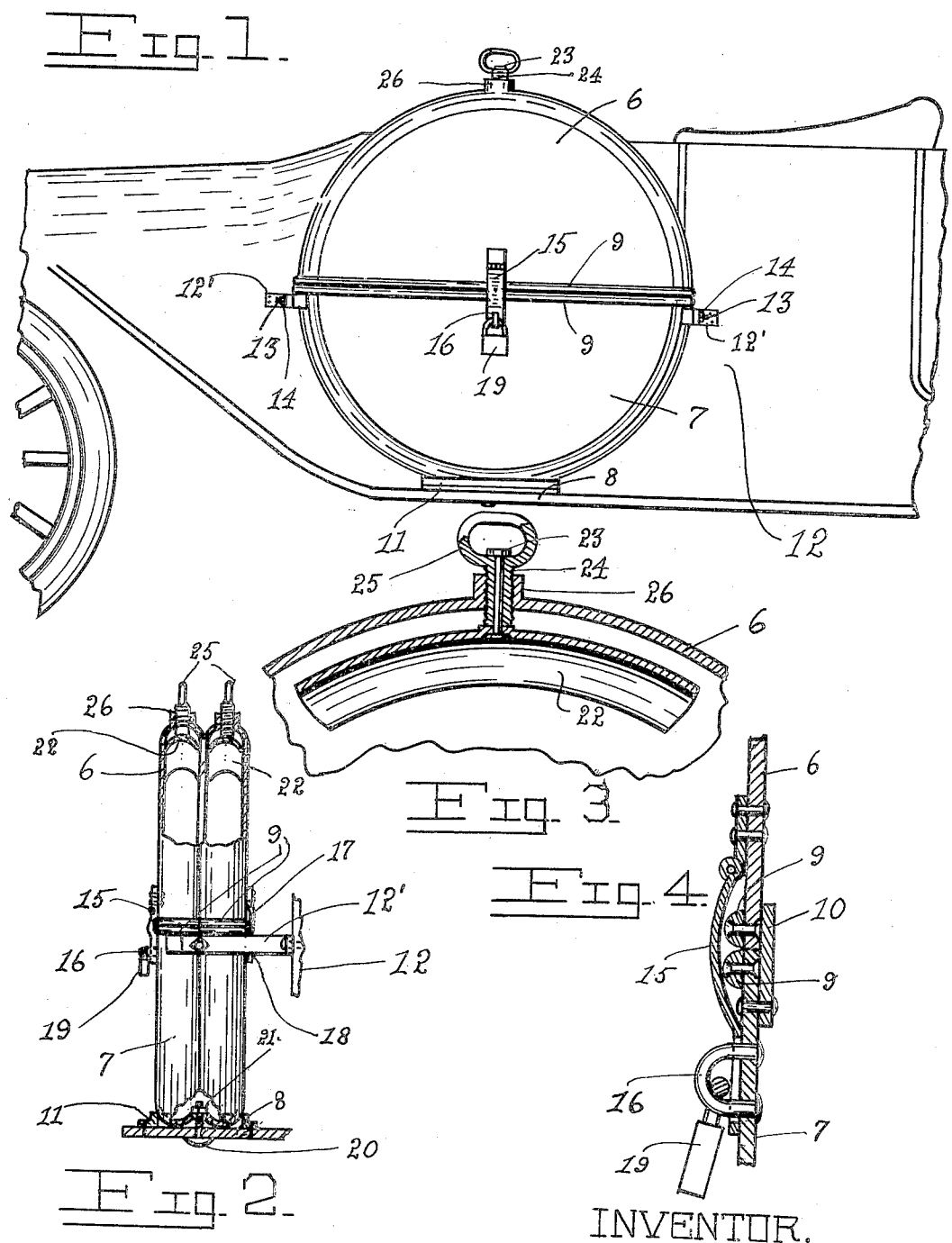

WILLIAM W. HADLEY, OF LOS ANGELES, CALIFORNIA.

STORAGE-CASE FOR PNEUMATIC TIRES.

1,319,388.   Specification of Letters Patent.   Patented Oct. 21, 1919.

Application filed May 15, 1919. Serial No. 297,225.

*To all whom it may concern:*

Be it known that I, WILLIAM W. HADLEY, citizen of the United States, residing at the city of Los Angeles, county of Los Angeles, and State of California, have invented new and useful Improvements in Storage-Cases for Pneumatic Tires; and the object thereof is to provide a cheap, simple, and efficient means for storing tires on an automobile, so that they will be protected from dust and the weather.

A further object is to provide means for easily and quickly attaching and adjusting the case to a vehicle.

I accomplish these objects by means of the device described herein and illustrated in the accompanying drawings forming a part hereof, in which:

Figure 1 is a side elevation of a fragment of an automobile showing my invention attached to the running board of the same.

Fig. 2 is an end elevation partly in section of my tire case.

Fig. 3 is an enlarged sectional detail of the upper portion of the case.

Fig. 4 is an enlarged sectional detail of one of the fastenings.

My improved tire case comprises two sheet metal sections of a configuration to snugly chamber one or more tires or shoes as desired. In the drawings I have illustrated the case as adapted to contain two tires. The sections 6 and 7 are preferably equal size and when assembled and in place on a machine the dividing line between the sections is parallel with the running board 8 of the machine. On the outer meeting edges of the sections I prefer to use half round reinforcing metallic bands 9 which may be riveted or otherwise secured to the edges of the sections.

To the inner edge of one of the sections preferably the lower section, I secure a lap strip 10 which extends a short distance into the other section thereby making a dust tight joint between the sections and preventing any lateral movement between the sections.

Upon the running board I mount in any suitable manner a metal frame 11, in which is snugly secured the lower edge of the case. Upon the sides of the body 12 of the machine, I secure at each side of the case an L shaped metal retaining strap 12' each of which has a hole in the free end in which is secured a threaded stud bolt 13. There is one of these bolts on each side secured to a plate fastened in any suitable manner to the lower member of the case near its upper edge. Nuts 14 on these bolts secure the lower section securely on the running board. Secured to the central portion near the lower edge on one side thereof is a hasp 15 which passes over a staple 16 secured to the lower section. On the other side of the upper section is secured a snap strap 17, the free end of which has a hole therein, and passes over a stud 18 secured to the lower section. When the upper section is in place on the lower section a padlock 19 may be passed through the hasp, thereby locking the sections securely together. A bolt 20 may be passed through the running board and into the case, which is depressed at this point sufficiently to chamber a nut 21 on the bolt whereby the case is secured against removal when the padlock is in place and locked.

When a tire is new it is firm and compact, but by use it spreads out and become somewhat larger and a tire case must be large enough to receive the tire after wear. A new tire would rattle in a case large enough to receive a worn tire. To prevent the tires from rattling in the case I provide a follower 22, in the upper section, which is carried by a bolt 23 which passes up through and is revoluble in the threaded shank 24 of handle 25. The upper section of the case for each tire has secured thereto a threaded collar 26 in which shank 24 passes. When handle 25 is rotated it raises or depresses follower 22 so that when a tire is in place the follower can be positioned to hold the tire on the bottom of the case and thereby prevent the same from rattling.

By this construction it will be observed that when the case is positioned and locked it cannot be removed from the machine, and that the upper section can be quickly removed when access can be had to take out the tires, and the case can then be easily removed from the machine. A case for one tire is constructed in like manner.

Having described my invention I claim:—

1. A tire case made of sheet metal in two sections of a configuration to receive one or more tires, one of said sections being the top and the other the bottom when positioned for use; a lap strip secured to the inner side of the edge of the lower section and adapted to project into the upper section; hasps secured to the sides of the upper section; staples secured to the sides of the lower section adapted to be engaged by the hasps of the upper section; a threaded collar secured upon the edge of the upper section; a handle having a hollow externally threaded shank passing through said collar; a bolt passing through said shank; a follower connected to the lower end of said bolt; and means to secure said lower section upon the running board of the machine.

2. A tire case made of sheet metal in two sections of a configuration to receive one or more tires, one of said sections being the top and the other the bottom when positioned for use; a lap strip secured to the inner side of the edge of the lower section and adapted to project into the upper section; hasps secured to the sides of the upper section; staples secured to the sides of the lower section adapted to be engaged by the hasps of the upper section; a threaded collar secured upon the edge of the upper section; a handle having a hollow externally threaded shank passing through said collar; a bolt passing through said shank; a follower connected to the lower end of said bolt; straps secured to the sides of said lower section adapted to be fastened to the machine, said lower section having bolt holes in the bottom thereof; bolts adapted to be passed through the running board and said holes and to be secured by nuts within said section; and a padlock adapted to be passed through said staple after the hasp is in place thereon, whereby the parts of the case are locked against removal from the machine.

In witness that I claim the foregoing I have hereunto subscribed my name this 8th day of May 1919.

W. W. HADLEY.